United States Patent
Koda

(10) Patent No.: US 11,884,780 B2
(45) Date of Patent: Jan. 30, 2024

(54) MODIFIED CONJUGATED DIENE POLYMER AND POLYMER COMPOSITION INCLUDING SAID MODIFIED CONJUGATED DIENE POLYMER

(71) Applicant: KURARAY CO., LTD., Kurashiki (JP)

(72) Inventor: Daisuke Koda, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 50 days.

(21) Appl. No.: 17/625,489

(22) PCT Filed: Jul. 10, 2020

(86) PCT No.: PCT/JP2020/026953
§ 371 (c)(1),
(2) Date: Jan. 7, 2022

(87) PCT Pub. No.: WO2021/006330
PCT Pub. Date: Jan. 14, 2021

(65) Prior Publication Data
US 2022/0267537 A1    Aug. 25, 2022

(30) Foreign Application Priority Data
Jul. 11, 2019  (JP) .................. 2019-129123

(51) Int. Cl.
| C08G 81/02 | (2006.01) |
| C08F 279/02 | (2006.01) |
| C08F 222/06 | (2006.01) |
| C08F 36/08 | (2006.01) |

(52) U.S. Cl.
CPC ............ *C08G 81/025* (2013.01); *C08F 36/08* (2013.01); *C08F 222/06* (2013.01); *C08F 279/02* (2013.01)

(58) Field of Classification Search
CPC ...... C08F 279/02; C08F 222/06; C08F 36/08; C08G 81/025
See application file for complete search history.

(56) References Cited

U.S. PATENT DOCUMENTS

| 6,809,160 | B2 | 10/2004 | Tsuboniwa et al. |
| 8,816,005 | B2 | 8/2014 | Cosgrove et al. |
| 10,870,817 | B2 | 12/2020 | Findlay et al. |
| 2002/0188070 | A1 | 12/2002 | Tsuboniwa et al. |
| 2010/0233314 | A1* | 9/2010 | Cosgrove .............. C08F 236/02 426/3 |
| 2013/0095047 | A1 | 4/2013 | Castle et al. |
| 2016/0348037 | A1 | 12/2016 | Findlay et al. |

FOREIGN PATENT DOCUMENTS

| JP | 7-246624 A | 9/1995 |
| JP | 2002-161126 A | 6/2002 |
| JP | 2011-500908 A | 1/2011 |
| JP | 2011-038003 A | 2/2011 |
| JP | 2012-204246 A | 10/2012 |
| JP | 2013-512233 A | 4/2013 |
| JP | 2017-506681 A | 3/2017 |
| WO | WO 2008/104546 A1 | 9/2008 |
| WO | WO 2009/050203 A1 | 4/2009 |
| WO | WO 2015/002308 A1 | 1/2015 |

OTHER PUBLICATIONS

International Search Report dated Sep. 15, 2020 in PCT/JP2020/026953 (with English translation), 5 pages.
Written Opinion of the International Searching Authority dated Sep. 15, 2020 in PCT/JP2020/026953 (with English translation), 6 pages.
Extended European Search Report dated Jun. 28, 2023 in European Patent Application No. 20836530.4, 7 pages.

* cited by examiner

*Primary Examiner* — Robert D Harlan
(74) *Attorney, Agent, or Firm* — Oblon, McClelland, Maier & Neustadt, L.L.P.

(57) ABSTRACT

The present invention provides a modified conjugated diene polymer that has excellent hydrophilicity and is useful for modification of polar polymers. The present invention also provides a modified conjugated diene polymer and a polymer modifier that, when used for modification of a polar polymer, can enhance characteristics, for example, flexibility, of the composition including the polymer and also offer excellent processability and shaping properties. The present invention further provides a polymer composition including such a conjugated diene polymer. A polymer modifier (A) includes a modified conjugated diene polymer (A1) having a hydrophilic group having a polyethylene glycol structure.

5 Claims, No Drawings

MODIFIED CONJUGATED DIENE POLYMER AND POLYMER COMPOSITION INCLUDING SAID MODIFIED CONJUGATED DIENE POLYMER

CROSS REFERENCE TO RELATED APPLICATIONS

This application is a national stage entry under 35 USC 371 of PCT/JP2020/026953, filed on Jul. 10, 2020, and claims priority to Japanese Patent Application No. 2019-129123, filed on Jul. 11, 2019. The entire disclosures of these related applications are incorporated herein by reference.

TECHNICAL FIELD

The present invention relates to a modified conjugated diene polymer and a polymer composition including the modified conjugated diene polymer.

BACKGROUND ART

Conjugated diene polymers are polymers with excellent rubber elasticity and are conventionally used in various applications such as tires and industrial products. On the other hand, polyethylene glycols are materials having high hydrophilicity and are expected to be applied as biocompatible materials or the like. The development of materials having combined characteristics of these two kinds of materials is expected.

For example, polymer materials obtained by graft-copolymerizing an ethylene oxide-propylene oxide copolymer to a modified liquid polybutadiene have been studied as components in aqueous adhesive compositions (see, for example, Patent Literature 1). Further, a technique has been studied in which a monomer is emulsion-polymerized in the presence of an emulsifier obtained by ring-opening of maleic anhydride-modified polybutadiene with a hydroxyl-containing compound such as polyethylene glycol followed by neutralization (see, for example, Patent Literature 2). Further, particles containing a bleaching agent have been studied for use as a cleaning composition or the like. A graft copolymer of polyisoprene with polyethylene glycol, which is an amphiphilic graft polymer, is studied for use as a coating layer on such particles (see, for example, Patent Literature 3).

CITATION LIST

Patent Literature

Patent Literature 1: JP-A-2011-038003
Patent Literature 2: JP-A-2012-204246
Patent Literature 3: JP-A-2017-506681

SUMMARY OF INVENTION

Technical Problem

However, all the documents mentioned above are completely silent with respect to modified conjugated diene polymers with a polyethylene glycol structure that are useful for modification of polar polymers.

The present invention has been made in view of the circumstances discussed above and provides a modified conjugated diene polymer that has excellent hydrophilicity and is useful for modification of polar polymers. The present invention also provides a modified conjugated diene polymer and a polymer modifier that, when used for modification of a polar polymer, can enhance characteristics, for example, flexibility, of the composition including the polymer and also offer excellent processability and shaping properties. The present invention further provides a polymer composition including such a modified conjugated diene polymer.

Solution to Problem

After extensive studies, the present inventors have found that a specific hydrophilic modified conjugated diene polymer exhibits excellent hydrophilicity and is useful for polymer modification, and that the specific hydrophilic modified conjugated diene polymer when used for modification of a polymer can enhance characteristics, for example, flexibility, of the composition including the polymer and also offers excellent processability and shaping properties of the composition. The present invention has been completed based on these findings.

Specifically, the present invention pertains to the following [1] to [10'].

[1] A modified conjugated diene polymer ($\alpha$) having a hydrophilic group, the hydrophilic group having a polyethylene glycol structure, wherein
the amount of modification with the hydrophilic group is 1 to 400 parts by mass with respect to 100 parts by mass of the conjugated diene polymer before modification, and
the modified conjugated diene polymer has a melting point of not more than 60° C. or shows no melting point.

[2] The modified conjugated diene polymer ($\alpha$) described in [1], wherein the weight average molecular weight is not less than 5,000 and not more than 80,000.

[3] The modified conjugated diene polymer ($\alpha$) described in [1] or [2], which comprises 20 to 100 mol % of isoprene units as monomer units.

[4'] A polymer modifier (A) comprising a modified conjugated diene polymer (Al) having a hydrophilic group having a polyethylene glycol structure.

[5'] The polymer modifier (A) described in [1], wherein the weight average molecular weight of the modified conjugated diene polymer (Al) is not less than 5,000 and not more than 80,000.

[6'] The polymer modifier (A) described in [4] or [5], wherein the amount of modification with the hydrophilic group contained in the modified conjugated diene polymer (Al) is 1 to 400 parts by mass with respect to 100 parts by mass of the conjugated diene polymer before modification.

[7'] The polymer modifier (A) described in any of [4] to [6], wherein the modified conjugated diene polymer (Al) has a melting point of not more than 60° C. or shows no melting point.

[8'] The polymer modifier (A) described in any of claims [4] to [7], wherein the modified conjugated diene polymer (Al) comprises 20 to 100 mol % of isoprene units as monomer units constituting a polymer chain derived from an unmodified conjugated diene polymer (A').

[9'] A polymer composition comprising the polymer modifier (A) described in any of [4] to [8] and a polar polymer (B).

[10'] The polymer composition described in [9], wherein the mass ratio (A)/(B) of the polymer modifier (A) to the polar polymer (B) is 1/99 to 99/1.

Advantageous Effects of Invention

The modified conjugated diene polymer according to the present invention has excellent hydrophilicity and is useful for polymer modification. The polymer composition includes a highly hydrophilic modified conjugated diene polymer and can attain enhancements in characteristics, for example, flexibility. Further, the polymer composition is also excellent in processability and shaping properties.

DESCRIPTION OF EMBODIMENTS

[Polymer Modifiers (A)]

A polymer modifier (A) of the present invention comprises a modified conjugated diene polymer (A1) that has a hydrophilic group having a polyethylene glycol structure. When used as a polymer modifier, the modified conjugated diene polymer (A1) having such a hydrophilic group is expected to give a polymer composition that attains enhancements not only in hydrophilicity but also in polymer properties such as flexibility and in shaping properties such as stretch processability.

An unmodified conjugated diene polymer (A1') that is a raw material for the modified conjugated diene polymer (A1) having a hydrophilic group includes conjugated diene units as monomer units constituting the polymer. Examples of the conjugated dienes include butadiene; isoprene; and conjugated dienes (a1) except butadiene and isoprene, such as 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, α-farnesene, β-farnesene and chloroprene. The conjugated diene units present in the unmodified conjugated diene polymer (A1') preferably include monomer units derived from butadiene and/or isoprene.

The unmodified conjugated diene polymer (A1') serving as a raw material for the modified conjugated diene polymer (A1) preferably contains monomer units derived from butadiene and/or isoprene in an amount of not less than 50 mass % of all the monomer units constituting the polymer. The total content of butadiene units and isoprene units is preferably 60 to 100 mass %, and more preferably 70 to 100 mass % relative to all the monomer units forming the conjugated diene polymer (A1').

In the unmodified conjugated diene polymer (A1') serving as a raw material for the modified conjugated diene polymer (A1), the content of isoprene units is preferably 20 to 100 mol %, and more preferably 50 to 100 mol % of all the monomer units. In a preferred embodiment, isoprene units represent 100 mol % of the monomer units constituting the polymer chain that will be the main chain of the modified conjugated diene polymer (namely, the polymer chain derived from the unmodified conjugated diene polymer (A')). That is, the polymer chain of the modified conjugated diene polymer preferably consists solely of isoprene units.

In addition to the conjugated diene units, the modified conjugated diene polymer (A1) may include additional monomer units such as units from aromatic vinyl compounds (a2).

Examples of the aromatic vinyl compounds (a2) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl) styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Among these aromatic vinyl compounds, styrene, α-methylstyrene and 4-methylstyrene are preferable.

In the unmodified conjugated diene polymer (A1'), the content of the additional monomer units other than the butadiene and isoprene units is not more than 50 mass %, more preferably not more than 40 mass %, and still more preferably not more than 30 mass %. When, for example, the content of the aromatic vinyl compound (a2) units is within the above range, the polymer modifier (A) comprising such a modified conjugated diene polymer (A1) gives a polymer composition that tends to attain enhanced shaping properties and tends to give films exhibiting enhanced processability such as stretch processability.

When the modified conjugated diene polymer (A1) includes monomer units other than the isoprene units, the content of such monomer units other than the isoprene units is preferably not more than 80 mol %, and more preferably not more than 50 mol %.

The unmodified conjugated diene polymer (A1') is preferably a polymer obtained by polymerizing a conjugated diene and optionally additional monomers other than conjugated dienes by a process such as, for example, emulsion polymerization or solution polymerization.

The emulsion polymerization process may be a known process or a process that is deemed as known. For example, monomers including a prescribed amount of the conjugated diene may be emulsified and dispersed in the presence of an emulsifier and may be emulsion polymerized with use of a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

Usually, water is used as a dispersant. The dispersant may include a water-soluble organic solvent such as methanol or ethanol as long as the stability during the polymerization is not impaired.

Examples of the radical polymerization initiators include persulfate salts such as ammonium persulfate and potassium persulfate, organic peroxides and hydrogen peroxide.

To control the molecular weight of the unmodified conjugated diene polymer (A1') that is obtained, a chain transfer agent may be used. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with, for example, the type of the radical polymerization initiator used. The temperature is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the conjugated diene polymer (A1') is coagulated by the addition of a coagulant salt such as sodium chloride, calcium chloride or potassium chloride optionally together with an acid such as nitric acid or sulfuric acid to control the pH of the coagulated system to a predetermined value. The dispersion solvent is then separated, thereby recovering the polymer. Next, the polymer is washed with water, dehydrated and dried. In this manner, the conjugated diene polymer (A1') may be obtained. During the coagulation process, the latex may be mixed together with an emulsified dispersion of an extender oil as required, and the unmodified conjugated diene polymer (A1') may be recovered as an oil-extended rubber.

The solution polymerization process may be a known process or a process that is deemed as known. For example, monomers including the conjugated diene are polymerized in a solvent with a Ziegler catalyst, a metallocene catalyst or an active metal or an active metal compound capable of catalyzing anionic polymerization, optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Of the active metals capable of catalyzing anionic polymerization, alkali metals and alkaline earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalene and potassium naphthalene. Of these organoalkali metal compounds, organolithium compounds are preferable, and organomonolithium compounds are more preferable.

The amount in which the organoalkali metal compound is used may be determined appropriately in accordance with factors such as the melt viscosities and molecular weights of the unmodified conjugated diene polymer (A1') and the modified conjugated diene polymer (A1) having a hydrophilic group. Usually, the amount of such a compound is 0.01 to 3 parts by mass per 100 parts by mass of all the monomers including the conjugated diene.

The organoalkali metal compound may be used in the form of an organoalkali metal amide by being subjected to a reaction with a secondary amine such as dibutylamine, dihexylamine or dibenzylamine.

The polar compounds are usually used for the purpose of controlling the microstructure of conjugated diene moieties without deactivating the anionic polymerization reaction. Examples of the polar compounds include ether compounds such as dibutyl ether, tetrahydrofuran and ethylene glycol diethyl ether; tertiary amines such as tetramethylethylenediamine and trimethylamine; alkali metal alkoxides and phosphine compounds. The polar compounds are usually used in an amount of 0.01 to 1000 mol relative to the organoalkali metal compound.

The temperature of the solution polymerization is usually in the range of −80 to 150° C., preferably 0 to 100° C., and more preferably 10 to 90° C. The polymerization mode may be batchwise or continuous.

The polymerization reaction may be terminated by the addition of a polymerization terminator. Examples of the polymerization terminators include alcohols such as methanol and isopropanol. The unmodified conjugated diene polymer (A1') may be isolated by pouring the polymerization reaction liquid into a poor solvent such as methanol to precipitate the unmodified conjugated diene polymer (A1'), or by washing the polymerization reaction liquid with water followed by separation and drying.

Among the processes described above for the production of the unmodified conjugated diene polymer (A1'), the solution polymerization process is preferable.

For example, the unmodified conjugated diene polymer (A1') obtained as described above is modified with maleic anhydride and is thereafter modified with a compound that has a polyethylene glycol structure represented by the formula (1) described later directly or after at least part of the unsaturated bonds present in the conjugated diene polymer are hydrogenated.

The modified conjugated diene polymer (A1) of the present invention has a hydrophilic group. The hydrophilic group has a polyethylene glycol structure. The polyethylene glycol structure is a structure represented by the following formula (1').

[Chem. 1]

In the formula (1'), $R^2$, $R^3$, $R^4$ and $R^5$ each independently denote hydrogen or a C1-C6 monovalent hydrocarbon group, and n denotes the number of the repeating units and is an integer of 3 to 600. When the modified conjugated diene polymer of the present invention contains a plurality of hydrophilic groups, n may be the same as or different from one another. The structures are bonded to the polymer chain including the conjugated diene units, either directly or via a link, through at least one of the rightmost and leftmost bonds.

Examples of the C1-C6 hydrocarbon groups that may be represented by $R^2$, $R^3$, $R^4$ and $R^5$ include methyl group, ethyl group, propyl group, butyl group, pentyl group, hexyl group and phenyl group. $R^2$, $R^3$, $R^4$ or $R^5$ is preferably hydrogen.

To ensure that the polymer modifier (A) comprising the modified conjugated diene polymer (A1) of the present invention will give a polymer composition that has excellent hydrophilicity, attains still enhanced properties such as flexibility and exhibits still improved processability, the letter n is preferably 3 to 250, more preferably 3 to 100, and still more preferably 3 to 50.

The hydrophilic group may be bonded to any position on the polymer chain without limitation as long as the advantageous effects of the present invention are not impaired. The position may be at a terminal or a side chain of the polymer chain. To ensure that the polymer modifier (A) comprising the modified conjugated diene polymer (A1) of the present invention will give a polymer composition that has excellent hydrophilicity and also attains enhanced properties such as flexibility, the hydrophilic group is preferably present in a side chain of the polymer chain, and is more preferably present only in a side chain of the polymer chain.

In particular, the hydrophilic group having a polyethylene glycol structure is preferably a hydrophilic group having a structure of the following formula (1'A).

[Chem. 2]

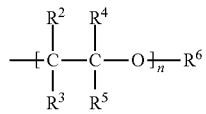

(1'A)

In the formula (1'A), $R^2$, $R^3$, $R^4$ and $R^5$ are the same as defined in the formula (1'), $R^6$ denotes hydrogen, a monovalent hydrocarbon group or an acyl group, the letter n denotes the number of the repeating units and is an integer of 3 to 600, and the leftmost bond is bonded to the polymer chain including the conjugated diene units of the modified conjugated diene polymer (A1), either directly or via a link.

Examples of the monovalent hydrocarbon groups that may be represented by $R^6$ include alkyl groups, alkenyl groups and phenyl groups. Among these, alkyl groups are preferable, methyl group, ethyl group and propyl group are more preferable, and methyl group is still more preferable.

Examples of the acyl groups that may be represented by $R^6$ include acetyl group, propyloyl group, butyloyl group, octyloyl group, lauroyl group, palmitoyl group and stearoyl group.

Preferred embodiments of $R^2$, $R^3$, $R^4$ and $R^5$ in the formula (1'A) are the same as those in the formula (1'). Preferred embodiments of n in the formula (1'A) are the same as those in the formula (1'). Further, specific embodiments and preferred embodiments of the position at which the hydrophilic group is bonded to the polymer chain of the conjugated diene polymer are the same as those in the formula (1').

From the point of view of easy production, the moiety having a structure of the formula (1'A) that is possessed by the modified conjugated diene polymer (A1) is preferably a moiety represented by the following formula (1'A-1).

[Chem. 3]

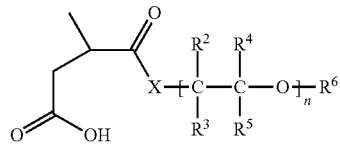

(1'A-1)

In the formula (1'A-1), $R^2$, $R^3$, $R^4$ and $R^5$ are the same as defined in the formula (1'), $R^6$ and n are the same as defined in the formula (1'A), X denotes oxygen or nitrogen, and the leftmost bond is directly bonded to the polymer chain including the conjugated diene units of the modified conjugated diene polymer (A1). Specific examples and preferred embodiments of $R^2$, $R^3$, $R^4$, $R^5$, $R^6$ and n in the formula (1'A-1) are the same as those in the formula (1'A).

The hydrophilic group described above may be introduced into the unmodified conjugated diene polymer (A1') by any method without limitation. For example, the hydrophilic group may be introduced by adding a modifying agent (β) having a functional group reactive with a hydroxyl group or an amino group or by adding a functional group to the unmodified conjugated diene polymer (A1') to prepare a modified conjugated diene polymer precursor (A1") having such a functional group, and reacting the modified conjugated diene polymer precursor (A1") with a compound (γ) having a hydroxyl group or an amino group and a polyethylene glycol structure.

Examples of the modifying agents (β) that may be added to the polymer chain of the conjugated diene polymer include unsaturated carboxylic acids and unsaturated dicarboxylic acid anhydrides. Examples of the functional groups that may be added to the polymer chain of the conjugated diene polymer include epoxy group and alkoxysilyl groups.

Examples of the unsaturated carboxylic acids include unsaturated monocarboxylic acids such as acrylic acid and methacrylic acid; and unsaturated dicarboxylic acids such as maleic acid, fumaric acid, itaconic acid and citraconic acid. Examples of the unsaturated dicarboxylic acid anhydrides include maleic anhydride, itaconic anhydride and citraconic anhydride.

Among these compounds, maleic anhydride is preferable from the viewpoint of economic efficiency.

The modifying agent (β) may be added to the unmodified conjugated diene polymer (A1') by any method without limitation. In an exemplary method, the conjugated diene polymer (A1') may be mixed together with the modifying agent (β) and, if necessary, a radical catalyst, and the mixture may be heated in the presence or absence of an organic solvent.

Examples of the organic solvents used in the above method include hydrocarbon solvents and halogenated hydrocarbon solvents. Among these organic solvents, hydrocarbon solvents such as n-butane, n-hexane, n-heptane, cyclohexane, benzene, toluene and xylene are preferable.

Examples of the radical catalysts used in the above method include peroxides such as di-s-butyl peroxydicarbonate, t-amyl peroxypivalate, t-amyl peroxy-2-ethylhexanoate, di-t-butyl peroxide and 1,4-bis[(t-butylperoxy)isopropyl]benzene; and azo compounds such as 2,2'-azobis(4-methoxy-2,4-dimethylvaleronitrile), 2,2'-azobis(isobutyronitrile), 1,1'-azobis(cyclohexane-1-carbonitrile) and 1-[(1-cyano-1-methylethyl)azo]formamide. In particular, from the points of view of safety and reaction efficiency, di-t-butyl peroxide, 1,4-bis[(t-butylperoxy)isopropyl]benzene, 2,2'-azobis(isobutyronitrile), 1,1'-azobis(cyclohexane-1-carbonitrile) and 1-[(1-cyano-1-methylethyl)azo]formamide are preferable.

In the above method, the modifying agent (β) is preferably added to the unmodified conjugated diene polymer (A1') at a temperature in the range of 100 to 250° C., and more preferably in the range of 140 to 200° C. The reaction time is preferably 4 to 50 hours.

The compound (γ) that is reacted with the modified conjugated diene polymer precursor (A1") has a hydroxyl group or an amino group and a polyethylene glycol structure. Examples of such compounds include those compounds with a polyethylene glycol structure that are represented by the following formula (1) (hereinafter, such compounds are also written as the polyethylene glycol compounds (1)).

[Chem. 4]

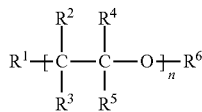

(1)

In the formula (1), $R^1$ is a hydroxyl group or an amino group. $R^2$, $R^3$, $R^4$, $R^5$ and n are the same as defined in the formula (1'), and $R^6$ is the same as defined in the formula (1'A).

Preferred embodiments of $R^2$, $R^3$, $R^4$ and $R^5$ in the formula (1) are the same as in the formula (1'). Preferred embodiments of n in the formula (1) are the same as in the formula (1'). Further, preferred embodiments of $R^6$ in the formula (1) are the same as in the formula (1'A).

Examples of the polyethylene glycol compounds (1) include triethylene glycol, triethylene glycol monomethyl ether, polyethylene glycol, polyethylene glycol monoalkyl ethers, polyethylene glycol monoalkylene alkyl ethers, polyethylene glycol monoalkylene alkenyl ethers, polyethylene glycol monoalkyl esters, propylene glycol, propylene glycol monoalkyl ethers, polypropylene glycol, polypropylene glycol monoalkyl ethers, methoxypolyethylene glycol amine, and monoalkyl ethers of copolymers of propylene oxide and ethylene oxide.

The molecular weight of the polyethylene glycol compound (1) is, for example, 200, 400, 1000, 2000, 4000, 6000, 8000 or 10000. The polyethylene glycol compounds may be used singly, or two or more may be used in combination.

The polyethylene glycol compound (1) may be added to the unmodified conjugated diene polymer (A1') by any method without limitation. For example, a method may be adopted in which the modifying agent (β) (for example, maleic anhydride) or the functional group described hereinabove is added to the unmodified conjugated diene polymer (A1'), then the compound (γ) having a hydroxyl group or an amino group and a polyethylene glycol structure (for example, the polyethylene glycol compound (1)) and further an amine catalyst as required are added, and the mixture is heated in the presence or absence of an organic solvent.

Examples of the amine catalysts include tertiary amines such as tetramethylethylenediamine, trimethylamine and N,N-dimethylbenzylamine.

For example, the organic solvent used in the above method is usually a hydrocarbon solvent or a halogenated hydrocarbon solvent. Of these organic solvents, hydrocarbon solvents such as n-butane, n-hexane, n-heptane, cyclohexane, benzene, toluene and xylene are preferable.

When the modifying agent (β) and the compound (γ) having a hydroxyl group or an amino group and a polyethylene glycol structure are added to the unmodified conjugated diene polymer by the modification reaction method, an antioxidant may be added for purposes such as to suppress side reactions.

Some preferred antioxidants used here are, for example, 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy]ethyl]-2,4,8,10-tetraoxaspiro[5.5]undecane (AO-80), 2,4-bis[(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl)ethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d,f][1,3,2]dioxaphosphepin-6-yloxy)propyl]-2-methylphenol (Sumilizer GP), tris(2,4-di-t-butylphenyl) phosphite (Irgafos 168), octadecyl 3,3'-dithiobispropionate, hydroquinone, p-methoxyphenol, N-phenyl-N'-(1,3-dimethylbutyl)-p-phenylenediamine (NOCRAC 6C), bis(2,2,6,6-tetramethyl-4-piperidyl) sebacate (LA-77Y), N,N-dioctadecylhydroxylamine (Irgastab FS 042) and bis(4-t-octylphenyl)amine (Irganox 5057). The antioxidants may be used singly, or two or more may be used in combination.

The amount in which the antioxidant is added is preferably 0 to 10 parts by mass, and more preferably 0 to 5 parts by mass per 100 parts by mass of the unmodified conjugated diene polymer (A1').

In the modified conjugated diene polymer (A1) having a hydrophilic group, the position at which the functional group is introduced may be a terminal of the polymer or a side chain of the polymer chain, but is preferably a side chain of the polymer chain for the reason that a plurality of functional groups may be introduced easily. The polymer may include a single kind of the functional group, or two or more kinds of the functional groups. That is, the modified conjugated diene polymer (A1) having a hydrophilic group may be modified with a single kind of the modifying agent or with two or more kinds of the modifying agents.

The hydrophilic modified conjugated diene polymer (A1) having the specific properties may be effectively produced by reacting the conjugated diene polymer modified with the modifying agent (β) (for example, maleic anhydride), with the compound (γ) having a hydroxyl group or an amino group and a polyethylene glycol structure (for example, the polyethylene glycol compound (1)) at an appropriate reaction temperature for a sufficient amount of reaction time. For example, the temperature in the reaction is preferably 10 to 200° C., and more preferably 30° C. to 180° C. The reaction time is preferably 1 to 200 hours, more preferably 1 to 100 hours, and still more preferably 1 to 50 hours.

The amount of modification with the hydrophilic groups in the modified conjugated diene polymer (A1) of the present invention is preferably 1 to 400 parts by mass, more preferably 20 to 300 parts by mass, and still more preferably 50 to 250 parts by mass with respect to 100 parts by mass of the unmodified conjugated diene polymer (that is, the conjugated diene polymer before modification with the hydrophilic groups). When the hydrophilic groups are contained in this range, the polymer modifier (A) comprising such a modified conjugated diene polymer (A1) gives a polymer composition that more reliably attains concurrent enhancements in hydrophilicity and other properties such as flexibility. When, for example, the hydrophilic groups are introduced by adding the polyethylene glycol compound (1), the amount of modification with the hydrophilic groups is the amount of modification with the polyethylene glycol compound (1) added in the modified conjugated diene polymer (A1). For example, this amount of modification may be determined using any of various analytical instruments such as nuclear magnetic resonance spectrometers.

The functional group equivalent of the modified conjugated diene polymer (A1) having a hydrophilic group is preferably 80 to 50,000 g/hydrophilic group-mol, more preferably 100 to 50,000 g/hydrophilic group-mol, and still more preferably 150 to 50,000 g/hydrophilic group-mol. For example, this range tends to ensure that a polymer composition including the modified conjugated diene polymer (A1) attains enhancements in processability such as stretch processability and in shaping properties.

The functional group equivalent of the modified conjugated diene polymer (A1) having a hydrophilic group means the mass of the conjugated diene and optional other monomers bonded per mol of the hydrophilic groups. The functional group equivalent may be calculated from the ratio of the area of the peak assigned to the polymer main chain to the area of the peak assigned to the functional groups using $^1$H-NMR or $^{13}$C-NMR.

The modified conjugated diene polymer (A1) of the present invention preferably has a melting point of not more than 60° C. or shows no melting point, more preferably has a melting point of not more than 50° C. or shows no melting point, and still more preferably has a melting point of not more than 40° C. or shows no melting point. When these melting point characteristics are satisfied, the polymer modifier (A) comprising such a modified conjugated diene polymer (A1) gives a polymer composition that tends to attain further enhancements not only in hydrophilicity but also in other properties such as flexibility. The melting point in the present invention is determined by differential scanning calorimetry (DSC). Specifically, a sample is heated to 80° C. at a heat-up rate of 10° C./min, held at 80° C. for 5 minutes, then cooled to −90° C. at a cooling rate of −10° C./min, held at −90° C. for 5 minutes and heated at a heat-up rate of 10° C./min while recording an endothermic curve in the range of temperatures from −90° C. to 80° C., the temperature at the peak top of the endothermic curve being taken as the melting point. In the present invention, the phrase that the polymer shows no melting point means that any endothermic peak is not observed in the temperature range of −90° C. to 80° C. when the DSC sample is heated at a heat-up rate of 10° C./min.

The weight average molecular weight (Mw) of the modified conjugated diene polymer (A1) is preferably not less than 5,000, more preferably not less than 6,000, and still more preferably not less than 7,000. The Mw is preferably not more than 80,000, more preferably not more than 50,000, and still more preferably not more than 30,000. The weight average molecular weight (Mw) in the present specification is the weight average molecular weight determined by gel permeation chromatography (GPC) measurement relative to standard polystyrenes.

When the Mw of the modified conjugated diene polymer (A1) is in the above range, excellent process flow efficiency is exhibited at the time of manufacturing and good economic efficiency is obtained. Further, the polymer modifier (A) that comprises the modified conjugated diene polymer (A1) having Mw in the above range gives a polymer composition which tends to exhibit good processability such as stretch processability and shaping properties and which tends to attain further enhancements not only in hydrophilicity but also in other properties such as flexibility.

In the present invention, two or more kinds of the modified conjugated diene polymers (A1) having different Mw values may be used in combination.

In the modified conjugated diene polymer (A1), the ratio of the weight average molecular weight (Mw) to the number average molecular weight (Mn), namely, the molecular weight distribution (Mw/Mn) is preferably 1.0 to 20.0, more preferably 1.0 to 15.0, and still more preferably 1.0 to 10.0. The above range of Mw/Mn is advantageous in that the modified conjugated diene polymer (A1) that is obtained tends to have a small variation in viscosity, and the polymer modifier (A) comprising such a polymer (A1) tends to give a polymer composition with enhanced properties. The number average molecular weight (Mn) in the present specification means the number average molecular weight determined by GPC measurement relative to standard polystyrenes.

The modified conjugated diene polymer (A1) is preferably a liquid polymer. The melt viscosity of the modified conjugated diene polymer (A1) measured at 38° C. is preferably 0.1 to 4,000 Pa·s, more preferably 1 to 3,500 Pa·s, and still more preferably 1 to 3,000 Pa·s. When the melt viscosity of the modified conjugated diene polymer (A1) is in the above range, the polymer modifier (A) comprising such a modified conjugated diene polymer (A1) tends to give a polymer composition which attains further enhancements in properties such as flexibility and which exhibits enhanced processability such as stretch processability and shaping properties. In the present invention, the melt viscosity is a value measured with a Brookfield viscometer at 38° C.

The vinyl content in the modified conjugated diene polymer (A1) is 0 mol % or more and less than 100 mol %, preferably 1 mol % or more and less than 70 mol %, and more preferably 3 mol % or more and less than 50 mol %. In the present invention, the "vinyl content" means the total molar percentage of 1,2-bonded, 3,4-bonded (in the case of other than farnesene) or 3,13-bonded (in the case of farnesene) conjugated diene units (conjugated diene units other than 1,4-bonded (in the case of other than farnesene) and 1,13-bonded (in the case of farnesene) conjugated diene units), relative to all the conjugated diene units in the modified conjugated diene polymer (A1) taken as 100 mol %. The vinyl content may be calculated by $^1$H-NMR from the ratio of the area of the peak assigned to 1,2-bonded, 3,4-bonded (in the case of other than farnesene) or 3,13-bonded (in the case of farnesene) conjugated diene units, and the area of the peak assigned to 1,4-bonded (in the case of other than farnesene) or 1,13-bonded (in the case of farnesene) conjugated diene units.

The vinyl content in the modified conjugated diene polymer (A1) may be brought to a desired value by, for example, selecting the types of the solvent and the optional polar compound used in the production of the unmodified conjugated diene polymer (A1'), or controlling the production conditions such as polymerization temperature.

The glass transition temperature (Tg) of the modified conjugated diene polymer (A1) is variable depending on factors such as the content of the conjugated diene units, the vinyl content in the conjugated diene units, the types of the conjugated dienes and the content of units from monomers other than the conjugated dienes, but is preferably −150 to 50° C., more preferably −130 to 50° C., and still more preferably −130 to 30° C. When the Tg is in the above range, for example, the polymer modifier (A) comprising such a modified conjugated diene polymer (A1) tends to give a polymer composition which attains further improvements in properties such as flexibility and which exhibits enhanced processability such as stretch processability and shaping properties.

In the modified conjugated diene polymer (A1) having a hydrophilic group, the catalyst residue content ascribed to the polymerization catalyst used in the polymer production is preferably in the range of 0 to 200 ppm in terms of metal. When, for example, the unmodified conjugated diene polymer (A1') that is the raw material for the hydrophilic modified conjugated diene polymer (A1) is produced using as the polymerization catalyst an organoalkali metal such as an organolithium compound, the metal based on which the catalyst residue content is determined is the alkali metal such as lithium. The catalyst residue content ascribed to the polymerization catalyst used in the production of the hydrophilic modified conjugated diene polymer (A1) is more preferably 0 to 150 ppm, and still more preferably 0 to 100 ppm in terms of metal. The catalyst residue content may be measured with, for example, a polarized Zeeman atomic absorption spectrophotometer.

For example, the catalyst residue content in the modified conjugated diene polymer (A1) may be controlled to the above specific range by purifying the hydrophilic modified conjugated diene polymer (A1) or the raw unmodified conjugated diene polymer (A1') to remove sufficiently the catalyst residue. The purification method is preferably washing with water or warm water, an organic solvent such as methanol or acetone, or supercritical fluid carbon dioxide. From the economic viewpoint, the number of washing operations is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content.

From the similar viewpoint, the catalyst residue content in a polymer composition of the present invention that includes the polymer modifier (A) and a polar polymer (B) is preferably 0 to 200 ppm, more preferably 0 to 150 ppm, and still more preferably 0 to 100 ppm in terms of metal. In this case, the catalyst residue content may include a catalyst residue content ascribed to the polymerization catalyst used in the production of the polar polymer (B) and/or other optional components contained in the polymer composition.

The polymer modifier (A) may comprise a single kind of the modified conjugated diene polymer (A1), or two or more kinds of the modified conjugated diene polymers (A1) in combination.

[Modified Conjugated Diene Polymers (α)]

Among the modified conjugated diene polymers (A1) described above, a preferred modified conjugated diene polymer is a modified conjugated diene polymer (α) having a hydrophilic group, the hydrophilic group having a polyethylene glycol structure, in which the amount of modification with the hydrophilic group is 1 to 400 parts by mass with respect to 100 parts by mass of the conjugated diene polymer before modification, and the modified conjugated diene polymer has a melting point of not more than 60° C. or shows no melting point. For example, such a modified conjugated diene polymer (α) is expected to give a polymer composition that more reliably attains concurrent enhancements in hydrophilicity and flexibility.

Preferred embodiments of the amount of modification with the hydrophilic groups in the modified conjugated diene polymer (α), other than those defined above, are the same as in the modified conjugated diene polymers (A1). Preferred embodiments of the functional group equivalent of the modified conjugated diene polymer (α) are the same as in the modified conjugated diene polymers (A1). Preferred embodiments of the melting point of the modified conjugated diene polymer (α), other than those defined above, are the same as in the modified conjugated diene polymers (A1).

Specific examples and preferred examples of the monomers for forming monomer units constituting the polymer chain of the modified conjugated diene polymer (α), and preferred ranges of the content of isoprene units and the content of monomer units other than the isoprene units in the polymer chain are the same as in the modified conjugated diene polymers (A1). Further, the definition, specific examples, preferred embodiments and other configurations of the hydrophilic groups with a polyethylene glycol structure that are contained in the modified conjugated diene polymer (α) are the same as in the modified conjugated diene polymers (A1).

Preferred embodiments of properties of the modified conjugated diene polymer (α) such as Mw, Mw/Mn, melt viscosity, vinyl content, Tg and catalyst residue content are the same as described in the modified conjugated diene polymers (A1). The modified conjugated diene polymer (α) may be produced in accordance with the method for producing the modified conjugated diene polymer (A1) described hereinabove.

[Polymer Compositions]

A polymer composition of the present invention comprises the polymer modifier (A) described hereinabove and a polar polymer (B). The polar polymer may be a thermoplastic polar polymer (B1) or a curable polar polymer (B2).

Examples of the thermoplastic polar polymers (B1) include acrylic polymers such as polymethyl methacrylate and (meth)acrylic acid ester polymers and copolymers; ethylene-polar monomer copolymers such as ethylene-vinyl acetate copolymer and ethylene ionomers; styrene-polar monomer copolymers such as styrene-maleic anhydride copolymer, acrylonitrile-styrene (AS) copolymer, acrylonitrile-butadiene-styrene (ABS) copolymer, acrylonitrile-ethylene propylene diene rubber-styrene (AES) copolymer, acrylonitrile-acrylic rubber-styrene (AAS) copolymer, acrylonitrile-chlorinated polyethylene-styrene (ACS) copolymer, methyl methacrylate-butadiene-styrene (MBS) copolymer, styrene-methyl methacrylate copolymer and styrene-methyl methacrylate-maleic anhydride copolymer; polyesters; polyamides; polycarbonates; polyvinyl chlorides; PVA (polyvinyl alcohols); ethylene-vinyl alcohol copolymers; polyacetals; polyurethanes; polyphenylene sulfides; polyphenylene ethers; and acrylic rubbers. Among these polar polymers (B1), polyamides, polyesters, polyurethanes and PVA are preferable.

Examples of the polyamides include nylon-6, nylon-66, nylon-610, nylon-11, nylon-12, and copolymers of these polymer components, such as nylon-6-nylon-66 copolymer and nylon-6-nylon-12 copolymer. Examples of the polyamides include semi-aromatic polyamides represented by the following structural formula (2).

[Chem. 5]

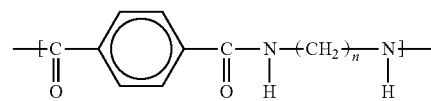

(2)

In the formula (2), n denotes an integer of 2 to 12.

The number average molecular weight of the polyamide is preferably in the range of 200 to 30,000, and the melting point thereof is preferably in the range of 150 to 270° C. To ensure that the composition that is obtained will have excellent processability, the number average molecular weight is preferably not more than 20,000, and the melting point is preferably not more than 260° C.

The polyamides may be used singly, or two or more may be used in combination.

The polyesters that are used here are thermoplastic. The polyesters contain ester bonds in the molecule. Typical polyesters are polyesters that have a structure formed by the polycondensation of a dicarboxylic acid and a glycol. Such polyesters are obtained by the polycondensation of an ester source such as a dicarboxylic acid, a lower ester thereof, an acid halide thereof or an acid anhydride, with a glycol. Other typical polyesters are obtained by the polycondensation of a compound having a hydroxyl group and a carboxyl group in the molecule or a dimer of this compound as the main raw material.

Examples of the aromatic or aliphatic dicarboxylic acids that may be used as one of the raw materials for the polyesters include oxalic acid, malonic acid, succinic acid, glutaric acid, pimelic acid, suberic acid, adipic acid, sebacic acid, azelaic acid, 1,9-nonanedicarboxylic acid, 1,10-decanedicarboxylic acid, 1,16-hexadecanedicarboxylic acid, terephthalic acid, isophthalic acid, p,p'-dicarboxydiphenyl, p-carboxyphenoxyacetic acid and 2,6-naphthalenedicarboxylic acid. Among these dicarboxylic acids, terephthalic acid and isophthalic acid are particularly preferable. The dicarboxylic acids may be used singly, or two or more may be used in combination.

The glycols (or diols) that are the other raw materials of the polyesters are roughly divided into aliphatic glycols and aromatic glycols. Examples of the glycols include ethylene glycol, 1,3-propanediol, 1,2-propanediol, 1,4-butanediol, 1,6-hexanediol, 1,4-cyclohexanediol, 1,9-nonanediol, 1,10-decanediol, neopentyl glycol and p-xylylene glycol. Among these glycols, C2-C10 alkylene glycols are preferable, and ethylene glycol, 1,4-butanediol and 1,9-nonanediol are more preferable. The glycols may be used singly, or two or more may be used in combination.

Examples of the compounds having a hydroxyl group and a carboxyl group in the molecule include lactic acid and lactide. A single kind, or two or more kinds of such compounds may be used as the raw materials for the polyesters.

Among the polyesters composed of dicarboxylic acid units and glycol units, particularly useful polyesters are polyethylene terephthalate, polybutylene terephthalate and copolymers of these polyesters obtained by replacing part of the monomer units with other monomer units. Among the polyesters that have units derived from the compound having a hydroxyl group and a carboxyl group in the molecule, polylactic acid is particularly useful.

The molecular weight of the polyester is preferably in the range of 500 to 100,000, and more preferably in the range of 5,000 to 50,000.

The polyester may be produced by any conventional polymerization method without limitation. For example, the polymerization may be performed in such a manner that the acid component described above such as terephthalic acid, isophthalic acid, an aliphatic dicarboxylic acid or an ester compound thereof is directly esterified or transesterified at one time or stepwise with one or more kinds of the glycols described above, and the resultant ester is polymerized. In the polymerization, any catalysts, stabilizers, modifiers, additives and other components that are conventionally used may be added.

Polylactones are also useful as the polyesters. Examples thereof include polylactones obtained by ring-opening polymerization of cyclic lactones such as, for example, pivalolactone, β-propiolactone and ε-caprolactone.

The polyesters described above usually have hydroxyl groups or carboxyl groups at their molecular terminals. These terminal functional groups of the polyesters may be inactivated by reaction with a monofunctional alcohol or a monofunctional carboxylic acid. Preferred results tend to be obtained when the polyester used in the present invention has, at part or all of its molecular terminals, a functional group having high affinity with the hydrophilic group of the modified conjugated diene polymer (A1) or (α). The use of a polyester containing such a functional group is expected to improve properties of the polymer composition that is obtained.

The polyesters may be polyethylene terephthalate and other polyesters used as fibers, films, resins or the like, or may be polybutylene terephthalate (PBT), polyethylene naphthalate (PEN), low-crystalline polyesters having a lower melting point than these polyesters, and polyether ester block polymers having a hard segment and a soft segment in the molecule.

The polyesters may be used singly, or two or more may be used in combination.

The polyurethanes are classified into perfect thermoplastic type and imperfect thermoplastic type depending on synthesis conditions, and whether the polyurethane is perfectly thermoplastic or imperfectly thermoplastic is determined by the molar ratio of the NCO groups in the raw material isocyanate to the OH groups in the raw material polyol and glycol. Those synthesized under conditions where about 0.95<NCO/OH 1.1 are perfectly thermoplastic, and those synthesized under conditions where about 1.1<NCO/OH are imperfectly thermoplastic.

Examples of the polyurethanes include those polyurethanes that include soft segments composed of polyol (polyester diol or polyether diol)-diisocyanate blocks, and hard segments composed of diisocyanate-glycol blocks.

Examples of the polyester diols include poly(1,4-butylene adipate), poly(1,6-hexane adipate) and polycaprolactone. Examples of the polyether diols include polyethylene glycol, polypropylene glycol and polyoxytetramethylene glycol. Examples of the glycols include ethylene glycol, 1,4-butanediol and 1,6-hexanediol. The diisocyanates are roughly divided into aromatic diisocyanates, alicyclic diisocyanates and aliphatic diisocyanates. Examples of the diisocyanates include tolylene diisocyanate, 4,4'-diphenylmethane diisocyanate, hexamethylene diisocyanate and isophorone diisocyanate.

In addition to the polyurethanes described above, other polyurethanes used as adhesives, foams, paints or the like may be used as the polar polymers (B) in the polymer composition of the present invention as long as they have sufficient affinity with the modified conjugated diene polymer (A1) or (a) of the present invention.

The molecular weight of the polyurethane is preferably in the range of 5,000 to 500,000, and preferably in the range of 10,000 to 300,000 from the point of view of mechanical characteristics.

The polyurethanes may be used singly, or two or more may be used in combination.

The PVA (polyvinyl alcohols) are polymers having vinyl alcohol units (—$CH_2$—CH(OH)—) as the principal structural units. The principal structural units are structural units representing the largest proportion of all the structural units, and preferably represent not less than 50 mol % of all the structural units (the same applies to the "principal structural units" described hereinafter). The PVA may have vinyl ester units or other units in addition to the vinyl alcohol units.

The PVA that are used may be those obtained by saponifying polyvinyl esters obtained by the polymerization of one, or two or more kinds of vinyl esters. Examples of the vinyl esters include vinyl acetate, vinyl formate, vinyl propionate, vinyl butyrate, vinyl pivalate, vinyl versatate, vinyl laurate, vinyl stearate, vinyl benzoate and isopropenyl acetate. Among the vinyl esters, those compounds having a vinyloxycarbonyl group ($H_2C$=CH—O—CO—) in the molecule are preferable for reasons such as easy production, availability and cost. Vinyl acetate is more preferable.

The polyvinyl esters are preferably those obtained using one, or two or more kinds of vinyl esters as the only monomers, and more preferably polyvinyl esters obtained using one kind of a vinyl ester as the only monomer. The polyvinyl esters may be copolymer resins of one, or two or more kinds of vinyl esters and a copolymerizable additional monomer(s) as long as the advantageous effects of the present invention are not significantly impaired.

The upper limit of the proportion of structural units derived from the above copolymerizable additional monomer(s) is preferably 15 mol %, more preferably 10 mol %, still more preferably 5 mol %, and further preferably 1 mol % based on the number of moles of all the structural units constituting the copolymer resin. That is, the lower limit of the proportion of the vinyl alcohol units relative to all the structural units in the PVA obtained by the saponification of the polyvinyl ester is preferably 85 mol %, more preferably 90 mol %, still more preferably 95 mol %, and further preferably 99 mol %.

Examples of the additional monomers copolymerizable with the vinyl esters include C2-C30 α-olefins such as ethylene, propylene, 1-butene and isobutene; (meth)acrylic acid and salts thereof; (meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate and octadecyl (meth)acrylate; (meth)acrylamide; (meth)acrylamide derivatives such as N-methyl (meth)acrylamide, N-ethyl (meth)acrylamide, N,N-dimethyl (meth)acrylamide, diacetone (meth)acrylamide, (meth)acrylamidopropanesulfonic acid and salts thereof, (meth)acrylamidopropyldimethylamine and salts thereof, and N-methylol (meth)acrylamide and derivatives thereof; N-vinylamides such as N-vinylformamide, N-vinylacetamide and N-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; vinyl cyanides such as (meth)acrylonitrile; vinyl halides such as vinyl chloride, vinylidene chloride, vinyl fluoride and vinylidene fluoride; allyl compounds such as allyl acetate and allyl chloride; maleic acid, and salts, esters and acid anhydrides thereof; itaconic acid, and salts, esters and acid anhydrides thereof; vinylsilyl compounds such as vinyltrimethoxysilane; and unsaturated sulfonic acids and salts thereof.

The polyvinyl esters may have structural units derived from one, or two or more kinds of the monomers described above.

The PVA that are used may be preferably not graft copolymers. However, the PVA may be modified with one, or two or more kinds of graft-copolymerizable monomers as long as the advantageous effects of the present invention are not significantly impaired. The graft copolymerization may be carried out on at least one of the polyvinyl ester and the PVA obtained by the saponification of the polyvinyl ester. Examples of the graft-copolymerizable monomers include unsaturated carboxylic acids and derivatives thereof; unsaturated sulfonic acids and derivatives thereof; and C2-C30 α-olefins. The proportion of structural units derived from the graft-copolymerizable monomer in the polyvinyl ester or the PVA is preferably not more than 5 mol % based on the number of moles of all the structural units constituting the polyvinyl ester or the PVA.

The PVA may or may not be crosslinked via part of its hydroxyl groups. The PVA may have an acetal structure formed by reaction of part of its hydroxyl groups with, for example, an aldehyde compound such as acetaldehyde or butyraldehyde.

The lower limit of the polymerization degree of the PVA is preferably 1,000, more preferably 1,500, and still more preferably 1,700. This lower limit of the polymerization degree of the PVA ensures that properties such as toughness of PVA films and stretched films that are obtained will be enhanced. On the other hand, the upper limit of the polymerization degree is preferably 10,000, more preferably 8,000, and still more preferably 5,000. When the polymerization degree of the PVA is not more than the above upper limit, it is possible to avoid an increase in PVA production cost and to reduce the occurrence of defects during film production. The polymerization degree of the PVA means the average polymerization degree measured in accordance with the description in JIS K6726-1994.

The lower limit of the saponification degree of the PVA may be, for example, 80 mol %, and is preferably 95 mol %, more preferably 98 mol %, and still more preferably 99 mol %. This lower limit of the saponification degree ensures that the advantageous effects of the present invention will be exhibited more prominently. For water-soluble film applications, PVA having a relatively low saponification degree may be used. On the other hand, the upper limit of the saponification degree may be 100 mol %. The saponification degree of the PVA is the proportion (mol %) of the number of moles of vinyl alcohol units to the total of the number of moles of structural units (typically vinyl ester units) that can be saponified into vinyl alcohol units and the number of moles of vinyl alcohol units. The saponification degree may be measured in accordance with the description in JIS K6726-1994.

Examples of the curable polar polymers (B2) include epoxy resins, unsaturated polyester resins, epoxy (meth)acrylate resins, ester (meth)acrylate resins, phenol resins, urea resins, melamine resins, thermosetting urethane resins, silicon resins, imide resins, furan resins, alkyd resins, allyl resins and diallyl phthalate resins. Among these, epoxy resins, unsaturated polyester resins and epoxy (meth)acrylate resins are preferable for reasons such as availability and basic properties of cured products, and also because the polymer composition that is obtained attains further enhancements in bubble releasability and toughness of cured products that are obtained. In particular, epoxy resins and unsaturated polyester resins are more preferable, and epoxy resins are still more preferable. The curable polar polymers (B2) may be used singly, or two or more may be used in combination.

The epoxy resins are not particularly limited as long as the polymer composition is curable. For example, epoxy resins containing at least two epoxy groups in the molecule may be preferably used. Examples of such epoxy resins include biphenyl epoxy resins, naphthalene epoxy resins, diphenyl ether epoxy resins, diphenyl thioether epoxy resins, hydroquinone epoxy resins, biphenyl novolak epoxy resins, cresol novolak epoxy resins, phenol novolak epoxy resins, bisphenol A novolak epoxy resins, trisphenol epoxy resins, tetraphenylolethane epoxy resins, dicyclopentadiene epoxy resins, bisphenol A epoxy resins and bisphenol F epoxy resins. Among these epoxy resins, bisphenol A epoxy resins are preferable. The epoxy resins may be used singly, or two or more may be used in combination.

When the polymer composition of the present invention includes the curable polar polymer (B2), the polymer composition may further include a curing agent. When, for example, an epoxy resin is contained as the curable polar polymer (B2), the curing agent may be, for example, a polyaddition curing agent such as an aliphatic polyamine, an alicyclic polyamine, an aromatic polyamine, an acid anhydride compound or a phenol novolak resin; or a catalytic curing agent such as an aromatic tertiary amine, a polymercaptan curing agent, for example, polymercaptan or a polysulfide resin, an imidazole compound (for example, 2-ethyl- 4-methylimidazole) or a Lewis acid complex. Among these curing agents, imidazole compounds are preferable. The curing agents may be used singly, or two or more may be used in combination.

When the polymer composition of the present invention includes the curable polar polymer (B2) and the curing agent, the content of the curing agent is not particularly limited. For reasons such as because air bubbles may be released more efficiently and because cured products that are obtained have still enhanced properties, the content of the curing agent with respect to 100 parts by mass of the curable polar polymer (B2) is preferably not less than 0.01 part by mass, more preferably not less than 0.1 part by mass, still more preferably not less than 0.5 parts by mass, particularly preferably not less than 1 part by mass, and most preferably not less than 2 parts by mass, and is preferably not more than 20 parts by mass, more preferably not more than 10 parts by mass, and still more preferably not more than 5 parts by mass.

In the polymer composition, the mass ratio (A)/(B) of the polymer modifier (A) to the polar polymer (B) is preferably 1/99 to 99/1, more preferably 3/97 to 50/50, and still more preferably 3/97 to 30/70. When the mass ratio (A)/(B) is in the above range, the polymer composition that is obtained tends not only to have excellent hydrophilicity but also to be improved in properties such as flexibility.

The polymer composition of the present invention may contain various additives without impairing the advantageous effects of the present invention. When, for example, the polar polymer (B) is the thermoplastic polar polymer (B1), exemplary additives that may be used are reinforcing agents or fillers such as calcium carbonate, silica, carbon blacks, glass fibers and clays, and plasticizers such as process oils, polyethylene glycol, glycerin and phthalic acid esters. Examples of the additives further include heat stabilizers, antioxidants, UV absorbers, colorants, pigments, lubricants and surfactants. Further, foaming agents may be used as additives. The polymer composition including a foaming agent and the thermoplastic polar polymer (B1) can produce foams.

When, for example, the polar polymer (B) is the curable polar polymer (B2), additives that may be used include curing agents, curing accelerators, known rubbers, thermoplastic elastomers, impact modifiers such as core-shell particles, fillers (for example, inorganic particles such as silica, talc, calcium carbonate and aluminum hydroxide), flame retardants, anti-foaming agents, pigments, dyes, antioxidants, weather stabilizers, lubricants and release agents.

The polymer composition of the present invention may be prepared by a usual high-molecular materials mixing method in accordance with factors such as the compositional ratio of the components such as the polymer modifier (A) comprising the modified conjugated diene polymer (A1), and the polar polymer (B).

When the polar polymer (B) is the thermoplastic polar polymer (B1), the polymer composition may be prepared with, for example, such a mixing device as an extruder, a mixing roll, a Banbury mixer or a kneader. In particular, the polymer composition in this case of the present invention is preferably produced by melt kneading with such a mixing device described above.

When the polar polymer (B) is the curable polar polymer (B2), the polymer composition may be prepared by, for example, sufficiently mixing the components with one another using a mixer or the like, then melt-kneading the mixture with a mixing roll, an extruder or the like, and cooling and crushing the melt-kneaded mixture.

The polymer composition of the present invention may be formed into shaped articles by various shaping methods that are conventionally known.

When the polar polymer (B) is the thermoplastic polar polymer (B1), shaped articles may be fabricated by shaping the polymer composition by, for example, extrusion, injection molding, blow molding, compression molding, vacuum forming or calendering. Articles of various shapes, sheets, films and other products may be obtained by these methods. Further, nonwoven fabrics and textiles may be fabricated by a method such as melt blowing or spunbonding.

When the polar polymer (B) is the curable polar polymer (B2), thermoset shaped articles may be fabricated by, for example, transfer molding the polymer composition. Alternatively, the polymer composition including the curable polar polymer (B2) may be shaped by, for example, injection molding or compression molding.

When the polar polymer (B) is the thermoplastic polar polymer (B1), shaped articles obtained from the polymer composition may be used as, for example, automobile interior and exterior parts such as bumpers and instrument panels, housing materials for home appliances such as televisions, stereos and vacuum cleaners, electric and electronic parts such as connectors, electric wire cable materials, food packaging materials or food containers such as meat and fish trays, fruit and vegetable packs and frozen food containers, packaging materials for industrial materials or the like, sports goods such as sports shoes materials, fabric or leather products, daily miscellaneous goods such as toys and sandals, various films and sheets, product-laminating materials, adhesives and pressure-sensitive adhesives, elastic materials used for disposable diapers or the like, various rubber products such as hoses, tubes and belts, and medical items.

When the polar polymer (B) is the curable polar polymer (B2), the polymer composition or cured products thereof may be used as, for example, various types of adhesives such as adhesives for fiber-reinforced composite materials (for example, adhesives for fiber-reinforced composite materials for concretes, adhesives for fiber-reinforced composite materials for transportation and carriage machines such as automobiles, railway vehicles and aircraft, and adhesives for fiber-reinforced composite materials for various sporting goods), and adhesives for assembling (for example, adhesives for assembling of parts of transportation and carriage machines such as automobiles, railway vehicles and aircraft); various types of paints such as anticorrosive and waterproof paints for water and sewerage systems, and anticorrosive paints for metals; various types of paint primers such as paint primers for construction and civil engineering, and paint primers for transportation and carriage machines such as automobiles, railway vehicles and aircraft; various types of lining materials such as lining materials for metals, lining materials for concretes, and lining materials for tanks; various types of repair materials such as concrete crack repair materials; and various types of electrical and electronic parts such as printed wiring boards, insulating boards, semiconductor sealing materials and packaging materials.

EXAMPLES

The present invention will be described in further detail by presenting Examples hereinbelow without limiting the scope of the invention to such Examples.

The following are the components used in Examples and Comparative Examples.

⟨Modified Conjugated Diene Polymers (A1)⟩
Modified conjugated diene polymers (A1-1) and (A1-2) obtained in Production Examples 2 and 3 described later.

⟨Polar Polymer (B)⟩
PVA (saponified product of vinyl acetate homopolymer, polymerization degree: 2,400, saponification degree: 99.5 mol %)

⟨Optional Components⟩
Glycerin (Plasticizer)
Sodium polyoxyethylene lauryl ether sulfate (surfactant)

Production Example 1: Synthesis of Conjugated Diene Polymer (A'1-1)

A thoroughly dried 5 L autoclave was purged with nitrogen and was charged with 1200 g of hexane and 112 g of s-butyllithium (a 10.5 mass % hexane solution). The temperature was raised to 50° C. While performing stirring, 1200 g of isoprene was sequentially added and polymerization was performed for 1 hour while controlling the polymerization temperature to 50° C. Thereafter, the polymerization reaction was terminated by the addition of methanol. A polymer solution was thus obtained. Water was added to the polymer solution obtained, and the mixture was stirred to wash the polymer solution with water. The stirring was terminated. After the polymer solution phase and the aqueous phase separated, water was discharged. The washed polymer solution was vacuum dried at 70° C. for 24 hours to give a conjugated diene polymer (A'1-1).

Production Example 2: Synthesis of Modified Conjugated Diene Polymer (A1-1) Having Hydrophilic Group A reaction vessel was charged with 250 g of the unmodified conjugated diene polymer (A'1-1) obtained in Production Example 1, and 50 g of maleic anhydride. The reaction was performed at 170° C. for 24 hours. Further, there were added 204 g of polyethylene glycol monomethyl ether 400 (a mixture based on $HO(CH_2CH_2O)_nCH_3$ in which n=7 to 9; manufactured by Tokyo Chemical Industry Co., Ltd.) and 0.9 g of N,N-dimethylbenzylamine. The reaction was performed for 6 hours to give a modified conjugated diene polymer (A1-1) having a hydrophilic group.

Production Example 3: Synthesis of Modified Conjugated Diene Polymer (A1-2) Having Hydrophilic Group A reaction vessel was charged with 200 g of the unmodified conjugated diene polymer (A'1-1) obtained in Production Example 1, and 40 g of maleic anhydride. The reaction was performed at 170° C. for 24 hours. Further, there were added 408 g of polyethylene glycol monomethyl ether 1000 (a mixture based on $HO(CH_2CH_2O)_nCH_3$ in which n=21 to 23; manufactured by Tokyo Chemical Industry Co., Ltd.) and 0.7 g of N,N-dimethylbenzylamine. The reaction was performed for 6 hours to give a modified conjugated diene polymer (A1-2) having a hydrophilic group.

Comparative Production Example 1: Synthesis of Maleic Anhydride-Modified Liquid Diene Polymer Methyl Esterified Product (A1-3)

A reaction vessel was charged with 200 g of the unmodified conjugated diene polymer (A'1-1) obtained in Production Example 1, and 40 g of maleic anhydride. The reaction was performed at 170° C. for 24 hours. Further, methanol was added in an amount of 1.05 molar equivalent relative to the maleic anhydride groups that had been added. The mixture was reacted at 90° C. for 10 hours to give a maleic anhydride-modified liquid diene polymer methyl esterified product (A1-3).

Production Example 4: Preparation of Aqueous Dispersion (A2-1) of Modified Conjugated Diene Polymer Having Hydrophilic Group 20 g of an aqueous sodium hydroxide solution (sodium hydroxide concentration: 50 mass %) was added to 250 g of the modified conjugated diene polymer (A1-1) having a hydrophilic group. The mixture was stirred at 50° C. for 60 minutes. Thereafter, 443 g of water was added in small portions while performing stirring. Thus, an aqueous dispersion (A2-1) of the modified conjugated diene polymer having a hydrophilic group was obtained.

Production Example 5: Preparation of Aqueous Dispersion (A2-2) of Modified Conjugated Diene Polymer Having Hydrophilic Group 13 g of an aqueous sodium hydroxide solution (sodium hydroxide concentration: 50 mass %) was added to 250 g of the modified conjugated diene polymer (A1-2) having a hydrophilic group. The mixture was stirred at 50° C. for 60 minutes. Thereafter, 451 g of water was added in small portions while performing stirring. Thus, an aqueous dispersion (A2-2) of the modified conjugated diene polymer having a hydrophilic group was obtained.

Production Example 6: Preparation of Aqueous Dispersion (A'2-1) of Conjugated Diene Polymer 15 g of an emulsifier ("Phosphanol RS-710" manufactured by TOHO Chemical Industry Co., Ltd.) was added to 250 g of the unmodified conjugated diene polymer (A'1-1). The mixture was stirred for 20 minutes. Subsequently, 177 g of water was added in small portions while performing stirring. After the predetermined amount of water had been added, the mixture was stirred for 20 minutes to give an aqueous dispersion (A'2-1) of the conjugated diene polymer.

The products such as the modified conjugated diene polymers obtained in Production Examples were analyzed by the following methods to measure and calculate properties.

(Method for Measuring Weight Average Molecular Weight)
The Mw of the polymer such as the modified conjugated diene polymer (A1) was determined by GPC relative to standard polystyrenes. The measurement apparatus and conditions were as follows.

Apparatus: GPC apparatus "HLC-8320GPC" manufactured by TOSOH CORPORATION
Separation column: Column "TSKgel Super HZ 4000" manufactured by TOSOH CORPORATION
Fluent: Tetrahydrofuran
Fluent flow rate: 0.7 mL/min
Sample concentration: 5 mg/10 mL
Column temperature: 40° C.

(Vinyl Content)
A sample such as the modified conjugated diene polymer (A1) was analyzed with $^1$H-NMR (500 MHz) manufactured by JEOL Ltd. to determine the vinyl content. The concentration was sample/deuterated chloroform=50 mg/1 mL, and the number of scans was 1024. With respect to the spectrum obtained, the vinyl content was calculated from the ratio of the area of the double bond peak assigned to the vinylated diene compound to the area of the double bond peak assigned to the non-vinylated diene compound.

(Method for Measuring Melt Viscosity at 38° C.)

The polymer such as the modified conjugated diene polymer (A1) was analyzed with a Brookfield viscometer (manufactured by BROOKFIELD ENGINEERING LABS. INC.) to determine the melt viscosity at 38° C.

(Glass Transition Temperature)

A 10 mg sample such as the modified conjugated diene polymer (A1) was collected in an aluminum pan and was analyzed by differential scanning calorimetry (DSC) at a heat-up rate of 10° C./min to measure a thermogram. The peak top value of DDSC was taken as the glass transition temperature Tg.

(Method for Measuring Melting Point)

A 10 mg sample such as the modified conjugated diene polymer (A1) was collected in an aluminum pan and was subjected to differential scanning calorimetry (DSC) where the sample was heated to 80° C. at a heat-up rate of 10° C./min, held at 80° C. for 5 minutes, cooled to −90° C. at a cooling rate of −10° C./min, held at −90° C. for 5 minutes, and heated at a heat-up rate of 10° C./min from −90° C. to 80° C. while recording a thermogram. The peak top temperature of the endothermic curve was taken as the melting point.

from the ratio of the area of the peak assigned to the hydrophilic groups and the area of the peak assigned to the polymer main chain.

[Functional group equivalent]=[Number of moles of the monomers constituting the polymer chain that was the main chain of the modified conjugated diene polymer]/[Number of moles of hydrophilic groups]×[Average molecular weight of the monomer units constituting the polymer chain that was the main chain of the modified conjugated diene polymer]

(Method for Measuring Amount of Modification with Hydrophilic Groups)

The modified conjugated diene polymer (A1) was analyzed by $^1$H-NMR to determine the molecular weight of the hydrophilic group from the peak assigned to the hydrophilic groups. The amount of the polyethylene glycol compound (1) as the modifier added in the polymer was calculated using the following equation.

[Amount of modification with hydrophilic groups]= [Molecular weight of hydrophilic group]/[Functional group equivalent of modified conjugated diene polymer]×100

Table 1 below describes the properties of the unmodified conjugated diene polymer (A'1-1) and the modified conjugated diene polymers (A1-1), (A1-2) and (A1-3) obtained in Production Examples 1 to 3 and Comparative Production Example 1.

TABLE 1

| | | Weight average molecular weight (×10³) | Isoprene unit content (mol %) | Vinyl content (mol %) | Melt viscosity (38° C.) (Pa·s) | Tg (° C.) | Melting point (° C.) | Modifying agents | Amount*3 of modification with hydrophilic groups (parts by mass) | Functional group equivalent (g/hydrophilic group-mol) |
|---|---|---|---|---|---|---|---|---|---|---|
| Prod. Ex. 1 | Conjugated diene polymer (A'1-1) | 8.9 | 100 | 7 | 3 | −63 | —*1 | —*1 | —*1 | —*1 |
| Prod. Ex. 2 | Modified conjugated diene polymer (A1-1) | 18.6 | 100 | 7 | 21.6 | −51 | 19.7 | Maleic anhydride Polyethylene glycol monomethyl ether | 72 | 522 |
| Prod. Ex. 3 | Modified conjugated diene polymer (A1-2) | 27.9 | 100 | 7 | 9.3 | —*2 | 37.8 | Maleic anhydride Polyethylene glycol monomethyl ether | 198 | 489 |
| Comp. Prod. Ex. 1 | Modified conjugated diene polymer (A1-3) | 13.3 | 100 | 7 | 478 | −39 | —*2 | Maleic anhydride Methanol | 6.4 | 486 |

*1No data available due to absence of hydrophilic groups.
*2No peaks observed.
*3Value relative to 100 parts by mass of unmodified conjugated diene polymer.

(Functional Group Equivalent of Modified Conjugated Diene Polymers (A1))

The functional group equivalent of the modified conjugated diene polymer (A1) is the mass of the conjugated diene and optional monomers other than the conjugated dienes, bonded per mol of the hydrophilic groups. The functional group equivalent was calculated by $^1$H-NMR Example 1

(Fabrication of PVA Film)

100 Parts by mass of PVA (saponified product of vinyl acetate homopolymer, polymerization degree: 2,400, saponification degree: 99.5 mol %), 15 parts by mass of the hydrophilic modified conjugated diene polymer (A1-1), 10 parts by mass of glycerin as a plasticizer, 0.1 part by mass of sodium polyoxyethylene lauryl ether sulfate as a surfactant, and water were mixed together to give a film-forming stock solution having a volatile content of 85 mass %. Here, the modified conjugated diene polymer (A1-1) that was mixed with the other components was the aqueous dispersion (A2-1) obtained in Production Example 4. The film-forming stock solution was cast over a metal drum having a surface temperature of 80° C. and was dried until the volatile content (the water content) became 5 mass %. Thus, a long PVA film (a PVA film before heat treatment) having a thickness of 30 µm, a length of 1.5 m and a width of 30 cm was obtained. This PVA film was heat-treated at a temperature of 110° C. for 10 minutes to give a PVA film of Example 1.

(Fabrication of Polarizing Film)

A sample was cut from a central portion in the width direction of the PVA film obtained as described above. The size of the sample was 5 cm in width and 10 cm in length so that an area 5 cm in width and 5 cm in length could be uniaxially stretched. The sample was subjected to swelling treatment in which the sample was immersed in pure water at 40° C. for 120 seconds while being uniaxially stretched 1.3 times in the longitudinal direction (first uniaxial stretching). Subsequently, the sample was immersed in a dyeing bath (temperature: 48° C.) that contained an aqueous solution containing 0.00002 mass % of Direct Blue 15 dye, 0.1 mass % of sodium tripolyphosphate and 0.1 mass % of sodium sulfate for 300 seconds while being uniaxially stretched 2.4 times in total in the longitudinal direction (second uniaxial stretching). The dye was thereby adsorbed to the sample. Further, the sample was immersed in a crosslinking bath (temperature: 40° C.) that contained an aqueous solution containing 2 mass % of boric acid for 60 seconds while being uniaxially stretched 2.7 times in total in the longitudinal direction (third uniaxial stretching). The boric acid was thereby adsorbed to the sample. Furthermore, the sample was immersed in a stretching bath (temperature: 58° C.) that contained an aqueous solution containing 3.9 mass % of boric acid while being uniaxially stretched in the longitudinal direction to a length 4.0 times the initial length of the film (fourth uniaxial stretching). The film was thus oriented. Immediately after being stretched, the sample was immersed in a water tank (temperature: 25° C.) as a washing tank for 5 seconds. Finally, the sample was dried at 70° C. for 3 minutes. A polarizing film of Example 1 was thus fabricated.

Example 2

(Fabrication of PVA Film)

A PVA film was obtained in the same manner as in the fabrication of the PVA film in Example 1, except that the amount of the modified conjugated diene polymer (A1-1) added was changed to 30 parts by mass.

(Fabrication of Polarizing Film)

A polarizing film was obtained in the same manner as in Example 1 using the PVA film obtained as described above.

Example 3

(Fabrication of PVA Film)

A PVA film was obtained in the same manner as in the fabrication of the PVA film in Example 1, except that the amount of the modified conjugated diene polymer (A1-1) added was changed to 45 parts by mass.

(Fabrication of Polarizing Film)

A polarizing film was obtained in the same manner as in Example 1 using the PVA film obtained as described above.

Example 4

(Fabrication of PVA Film)

A PVA film was obtained in the same manner as in the fabrication of the PVA film in Example 3, except that the modified conjugated diene polymer (A1-1) was changed to the polymer (A1-2).

(Fabrication of Polarizing Film)

A polarizing film was obtained in the same manner as in Example 1 using the PVA film obtained as described above.

Comparative Example 1

(Fabrication of PVA Film)

A PVA film was obtained in the same manner as in the fabrication of the PVA film in Example 1, except that the modified conjugated diene polymer (A1-1) was not added.

(Fabrication of Polarizing Film)

A polarizing film was obtained in the same manner as in Example 1 using the PVA film obtained as described above.

Comparative Example 2

(Fabrication of PVA Film)

A PVA film was obtained in the same manner as in the fabrication of the PVA film in Example 1, except that the modified conjugated diene polymer (A1-1) was changed to the polymer (A'1-1).

(Fabrication of Polarizing Film)

A polarizing film was obtained in the same manner as in Example 1 using the PVA film obtained as described above.

The PVA films and the polarizing films obtained in Examples and Comparative Examples were tested by the following methods to evaluate properties.

[Stretch Processability (Tensile Stress) of PVA Films]

The PVA film was humidity-conditioned at 23° C. and 50% RH for 24 hours, and a film piece 30 mm in longitudinal direction and 10 mm in width direction was cut out from the PVA film. Thereafter, the PVA film piece was attached to a tensile tester manufactured by Instron ("single column desktop tester: 5952") while setting the initial chuck distance to 10 mm. The film piece was tensile-tested at a rate of 100 [mm/min]. The test force [N] when the chuck distance reached 30 mm was divided by the sectional area [mm$^2$] of the original film before stretching, thereby determining the tensile stress [N/mm$^2$]. Here, the same measurement was repeated 10 times with respect to one sample, and the data obtained was averaged. The film was evaluated to be easily stretchable and have good stretch processability when the tensile stress was less than 50 N/mm$^2$.

[Shaping Properties (TD Breaking Strain) of Polarizing Films]

The polarizing film was humidity-conditioned at 23° C. and 50° RH for at least 24 hours. A film piece 10 mm in machine direction (MD) and 30 mm in transverse direction (TD) was cut out from the polarizing film. Thereafter, the polarizing film piece was attached to a tensile tester ("Autograph (AGS-H)" manufactured by Shimadzu Corporation) while setting the initial chuck distance to 10 mm and while ensuring that the polarizing film piece would be stretched in the TD. The tensile test was carried out in a heated environment at 140° C. at a rate of 100 [mm/min] (1000%/min). Here, the same measurement was repeated 10 times with respect to one sample, and the largest TD breaking strain data was adopted. The sample was evaluated to be easily shapeable and have good shaping properties when the TD breaking strain was 40% or more. Here, the TD breaking strain is the value calculated from (X/10)×100(%) wherein X is the length (mm) at which the polarizing film stretched from the initial chuck distance (10 mm) was broken in the above tensile test.

[Cleanability of Residue from Metal Drum During Fabrication of PVA Films]

In the fabrication of the PVA films containing the conjugated diene polymer, the conjugated diene polymer present on the surface of the PVA film became attached to the metal drum. The cleanability of the attachment was tested. Specifically, the metal drum after the production of the PVA film was wiped with a cotton waste cloth that had been moistened with water, and the surface of the metal drum was visually inspected for the presence or absence of any residual conjugated diene polymer. The cleanability was rated as B (poor) when the polymer had remained, and as A (good) when there was no polymer remaining.

(Appearance)

Whether the epoxy resin cured product obtained was transparent or not was determined by visual observation of the appearance.

Test pieces: 80 mm×10 mm×4 mm (Flexural Strength, Flexural Modulus and Flexural Strain)

The epoxy resin cured product obtained was tested with reference to JIS K 7171 and JIS K 6911 using Instron universal material testers 5966 and 59R5582 to determine the flexural strength, the flexural modulus and the flexural strain. The measurement conditions were as follows. The higher the flexural strength, the flexural modulus and the flexural strain, the more excellent the flexural properties of the epoxy resin cured product obtained.

Test pieces: 80 mm×10 mm×4 mm

Test speed: 2 mm/min

Distance between fulcrums: 64 mm (Izod Impact Strength)

The epoxy resin cured product obtained was tested in accordance with JIS K 7110 using digital impact tester

TABLE 2

| | Conjugated diene polymer | Content relative to PVA (mass %) | Conjugated diene polymer/ PVA (mass ratio) | Film thickness (μm) | Stretch processability (tensile stress N/mm²]) | Shaping properties (TD breaking strain [%]) | Cleanability |
|---|---|---|---|---|---|---|---|
| Ex. 1 | A1-1 | 15 | 13/87 | 30 | 48 | 200 | A |
| Ex. 2 | A1-1 | 30 | 23/77 | 30 | 43 | 300 | A |
| Ex. 3 | A1-1 | 45 | 31/69 | 30 | 43 | 1520 | A |
| Ex. 4 | A1-2 | 45 | 31/69 | 30 | 41 | 440 | A |
| Comp. Ex. 1 | None | 0 | — | 30 | 52 | 13 | —*4 |
| Comp. Ex. 2 | A'1-1 | 15 | 13/87 | 30 | —*5 | —*5 | B |

*4No conjugated diene polymer was added to the PVA film-forming stock solution, and thus the cleanability was not evaluated.
*5The conjugated diene polymer remained attached to the metal drum in the cleanability evaluation, and thus the film was not tested for stretch processability and shaping properties.

Example 5, Comparative Example 3 and Reference Example 1

According to the formulation (parts by mass) described in Table 3, the modified conjugated diene polymer and an epoxy resin (jER828: bisphenol A epoxy resin, manufactured by Mitsubishi Chemical Corporation) were mixed together for 4 minutes and defoamed for 2 minutes with a planetary stirring defoamer (manufactured by THINKY CORPORATION). To this mixture, a curing agent (2E4MZ: 2-ethyl-4-methylimidazole, manufactured by SHIKOKU CHEMICALS CORPORATION) was added in the amount (parts by mass) described in Table 3. The resultant mixture was manually stirred with a flat spatula to give an epoxy resin composition. A portion of the epoxy resin composition was poured into casting frames having respective sizes that would give test pieces for use in the evaluations described below, and was thereafter heated at 60° C. for 4 hours, further heated to 150° C. at a heat-up rate of 30° C./h and cured for 4 hours to give test pieces of the epoxy resin cured product. In the tensile shear bond strength test described later, test pieces were fabricated in the manner described later under the same conditions as above for the curing of the epoxy resin compositions. The test pieces of the epoxy resin cured products were tested by the following methods to evaluate the appearance, the flexural strength, the flexural modulus, the flexural strain, the Izod impact strength and the tensile shear strength. The results are described in Table 3.

DG-UB manufactured by Toyo Seiki Seisaku-sho, Ltd. to determine the Izod impact strength. The measurement conditions were as follows. The higher the Izod impact strength, the higher the impact resistance of the epoxy resin cured product obtained.

Test pieces: 80 mm×10 mm×4 mm, unnotched

Measurement conditions: Nominal pendulum energy: 0.538 N·m (hammer/1.0 J)

(Tensile Shear Bond Strength)

Two steel plates (25 mm×10 mm×4 mm: cold-rolled steel plates SPCC-SD) were provided. A mixture of the epoxy resin composition prepared as described above and 0.1 part by mass of glass beads with a diameter of 200 μm as a spacer was applied to one of the steel plates, and the other steel plate was placed thereon. The epoxy resin composition was cured under the curing conditions described hereinabove to bond the steel plates to each other. A test piece was thus fabricated. The test piece was tested in accordance with JIS K 6850 using universal material tester 59R5582 to determine the tensile shear bond strength. The measurement conditions were as follows. The higher the tensile shear bond strength, the higher the adhesion.

Test speed: 1 mm/min

Distance between chucks: 112 mm

TABLE 3

|  |  |  | Ex. 5 | Comp. Ex. 3 | Ref. Ex. 1 |
|---|---|---|---|---|---|
| Amounts (parts by mass) | Epoxy resin | jER828 | 100 | 100 | 100 |
|  | Modified conjugated diene polymers | A1-1 | 10 |  |  |
|  |  | A1-3 |  | 10 |  |
|  | Curing agent | 2E4MZ | 3 | 3 | 3 |
| Properties | Appearance after curing |  | Transparent | Not transparent | Transparent |
|  | Flexural strength (Pa · s) |  | 71.6 | 61.4 | 60.7 |
|  | Flexural modulus (GPa) |  | 2.49 | 2.41 | 2.67 |
|  | Flexural strain (%) |  | 4.9 | 3.1 | 3.0 |
|  | Izod impact strength (kJ/m$^2$) |  | 10 | 5.6 | 8.1 |
|  | Tensile shear bond strength (MPa) |  | 11.7 | 10.4 | 8.7 |

The comparison of Example 5 to Comparative Example 3 shows that the epoxy resin composition that was obtained using the hydrophilic modified conjugated diene polymer satisfying the requirements of the present invention was transparent and was satisfactory in flexural properties, impact resistance and adhesion.

INDUSTRIAL APPLICABILITY

The modified conjugated diene polymer according to the present invention, when used as a modifier for a polar polymer, is excellently dispersed in the polar polymer, and can offer enhancements in characteristics, for example, flexibility, processability and shaping properties of the composition containing the polymer. Thus, the polymer of the present invention is useful as a property modifier for various polar resins.

The invention claimed is:
1. A polymer composition, comprising:
   a polymer modifier (A) that is a modified conjugated diene polymer (α) having a hydrophilic group, the hydrophilic group having a polyethylene glycol structure; and
   a polar polymer (B) selected from the group consisting of a polyamide, a polyester, a polyurethane, a polyvinyl alcohol and a curable polar polymer, wherein
   an amount of modification with the hydrophilic group is 1 to 400 parts by mass with respect to 100 parts by mass of the conjugated diene polymer before modification, and
   the modified conjugated diene polymer (α) has a melting point of not more than 60° C. or shows no melting point.
2. The polymer composition according to claim 1, wherein the modified conjugated diene polymer (a) has a weight average molecular weight of not less than 5,000 and not more than 80,000.
3. The polymer composition according to claim 1, wherein the modified conjugated diene polymer (α) comprises 20 to 100 mol % of isoprene units as monomer units.
4. The polymer composition according to claim 1, wherein a mass ratio (A)/(B) of the polymer modifier (A) to the polar polymer (B) is 1/99 to 99/1.
5. The polymer composition according to claim 1, wherein:
   the modified conjugated diene polymer (α) is obtained by reacting a modified conjugated diene polymer precursor with a compound having a hydroxyl group or an amino group and a polyethylene glycol structure, and
   the modified conjugated diene polymer precursor has at least one functional group selected from the group consisting of an epoxy group and an alkoxysilyl group.

* * * * *